United States Patent
Hayashi et al.

[11] Patent Number: 6,156,434
[45] Date of Patent: Dec. 5, 2000

[54] FLUORINE TYPE FILM, LAMINATE EMPLOYING IT, AND PROCESS FOR PRODUCING THE LAMINATE

[75] Inventors: Atsushi Hayashi, Yokohama; Hiroshi Aruga, Kawasaki; Yasuo Hayashi, Yokohama; Kazuo Harada, Yokohama; Makoto Fukawa, Yokohama, all of Japan

[73] Assignee: Asahi Glass Company Ltd., Tokyo, Japan

[21] Appl. No.: 09/011,753

[22] PCT Filed: Aug. 23, 1996

[86] PCT No.: PCT/JP96/02355

§ 371 Date: Mar. 12, 1998

§ 102(e) Date: Mar. 12, 1998

[87] PCT Pub. No.: WO97/08229

PCT Pub. Date: Mar. 6, 1997

[30] Foreign Application Priority Data

Aug. 24, 1995 [JP] Japan .................................. 7-239170

[51] Int. Cl.[7] .......................... B32B 27/08; B32B 27/36; B32B 31/08; B32B 31/12; C08J 7/18

[52] U.S. Cl. ...................... 428/421; 428/480; 156/272.6; 156/274.8; 156/332; 427/490; 427/491; 427/536; 427/540

[58] Field of Search .................................. 428/421, 422, 428/480; 156/272.6, 274.8, 332; 427/490, 491, 539, 540, 536

[56] References Cited

U.S. PATENT DOCUMENTS

| | | | |
|---|---|---|---|
| 3,296,011 | 1/1967 | McBride et al. | 427/522 |
| 4,549,921 | 10/1985 | Wolfe, Jr. | 156/272.6 |
| 5,662,972 | 9/1997 | Shimada et al. | 428/35.7 |

FOREIGN PATENT DOCUMENTS

| | | |
|---|---|---|
| 0 597 120 | 5/1994 | European Pat. Off. . |
| 0 673 751 | 9/1995 | European Pat. Off. . |

OTHER PUBLICATIONS

Mark et al., Encyclopedia of Polymer Science and Engineering, vol. 9, pp. 598–602, Jan. 1988.

*Primary Examiner*—Paul Thibodeau
*Assistant Examiner*—Ramsey Zacharia
*Attorney, Agent, or Firm*—Oblon, Spivak, McClelland, Maier & Neustadt, P.C.

[57] ABSTRACT

A surface-treated PFA film, wherein hydroxyl groups and carbonyl groups are present on the surface of the surface-treated PFA film. Further, the surface state of the surface-treated surface is a surface state having no irregularities, and preferably the average surface roughness is at most 10 nm. The surface treatment is carried out by RF or DC bombardment method, preferably in an Ar gas atmosphere.

4 Claims, 6 Drawing Sheets

FLUORINE TYPE FILM, LAMINATE EMPLOYING IT, AND PROCESS FOR PRODUCING THE LAMINATE

TECHNICAL FIELD

The present invention relates to a tetrafluoroethylene-perfluoroalkoxyethylene type copolymer (hereinafter referred as PFA) film, a laminate employing it, and a process for producing the laminate.

BACKGROUND ART

A fluorine resin such as PFA is excellent in its chemical resistance and anti-fouling properties, and a laminate having a fluorine resin film laminated on a substrate of metal, plastic or the like, is used in a wide range of fileds, such as floor materials, copy boards, wall papers, roof materials, top plates for gas cooking stoves or hoods of gas ranges. To bond a fluorine resin film such as a PFA film to various substrates, surface treatment to impart physical or chemical modification to the fluorine resin surface will be required to make it wettable with the adhesive, since the surface energy of the fluorine resin is low.

As such surface treatment, corona discharge treatment is commonly known. Further, in order to improve the adhesive property, as a method which may be substituted for corona discharge treatment, a method of RF sputtering under high vacuum and high power density conditions (JP-A-51-125455), a method of RF sputtering in a special gas atmosphere (JP-A-6-285988) and a method of RF sputtering for a long period of time (JP-A-6-298971), have, for example, been proposed. However, with PFA films surface-treated by these methods, the adhesive strength has been practically insufficient.

Accordingly, the object of the present invention is to provide a PFA film which provides a good adhesive strength, a laminate employing such a PFA film, and a process for producing such a laminate.

DISCLOSURE OF THE INVENTION

The present inventors have studied in detail the relation between the adhesive strength and the functional groups on the surface-treated surface of the surface-treated PFA film, and as a result, have found that a PFA film which is a surface-treated PFA film, wherein hydroxyl groups and carbonyl groups are present on the surface-treated film surface, provide excellent adhesive strength.

Accordingly, the present invention provides a PFA film which is a surface-treated PFA film, wherein hydroxyl groups and carbonyl groups are present on the surface-treated film surface.

Further, the present inventors have studied in detail the relation between the adhesive strength and the irregularity state of the film surface of the surface-treated PFA film, and as a result, have found that a PFA film wherein the surface state of the surface-treated film surface is a surface state having substantially no irregularities, has particularly good adhesive strength.

Accordingly, the present invention provides a PFA film which is a surface-treated PFA film, wherein hydroxyl groups and carbonyl groups are present on the surface-treated film surface, and the surface state of the surface-treated film surface is a surface state having substantially no irregularities.

Preferably, the average surface roughness of the surface-treated film surface is at most 10 nm, more preferably at most 6 nm.

Further, the present inventors have conducted an extensive study on the relation between the adhesive strength of the surface-treated PFA film and the amount of fluorine atoms transferred to an adhesive surface of an adhesive tape when the adhesive tape was bonded to the film surface of the surface-treated PFA film and then peeled, and as a result, have found that a PFA film, wherein, when the adhesive surface of an adhesive tape is bonded to the surface-treated film surface, and then the adhesive tape is peeled from the film surface, the amount of fluorine atoms present on the adhesive surface of the adhesive tape after the peeling, is at most twice the amount of fluorine atoms present on an adhesive surface of an adhesive tape when the adhesive surface of the adhesive tape is bonded to the film surface of a PFA film having its surface non-treated, and then, the adhesive tape is peeled from the film surface, has particularly good adhesive strength.

Accordingly, the present invention provides a PFA film which is a surface-treated PFA film, wherein hydroxyl groups and carbonyl groups are present on the surface-treated film surface, and when an adhesive surface of an adhesive tape is bonded to the surface-treated film surface and then the adhesive tape is peeled from the film surface, the amount of fluorine atoms present on the adhesive surface of the adhesive tape after peeling, is at most twice, preferably at most once, the amount of fluorine atoms present on an adhesive surface of an adhesive tape when the adhesive surface of the adhesive tape is bonded on the film surface of a tetrafluoroethylene-perfluoroalkoxyethylene type copolymer having its surface non-treated, and then the adhesive tape is peeled from the film surface.

Here, the amount of fluorine atoms present on the adhesive surface of the adhesive tape after the peeling, is the total amount of all fluorine atoms contained in all molecules, polymer molecules and compounds containing fluorine and present on the adhesive surface of the adhesive tape after the peeling.

Further, the present invention provides a laminate comprising a substrate and a PFA film laminated on the substrate so that the surface-treated film surface of the PFA film, faces the substrate, wherein hydroxyl groups and carbonyl groups are present on the surface-treated film surface.

Furthermore, the present invention provides a laminate comprising a substrate and a PFA film laminated on the substrate so that the surface-treated film surface of the PFA film, faces the substrate, wherein the PFA film is a surface-treated PFA film, wherein hydroxyl groups and carbonyl groups are present on the surface-treated film surface, and the surface state of the surface-treated film surface is a surface state having no irregularities.

Preferably, the average surface roughness of the surface-treated film surface is at most 10 nm, more preferably at most 6 nm.

Preferably, an adhesive is further provided between the substrate and the PFA film, and the substrate and the PFA film are bonded by the adhesive.

BEST MODE FOR CARRYING OUT THE INVENTION

Figure 1:
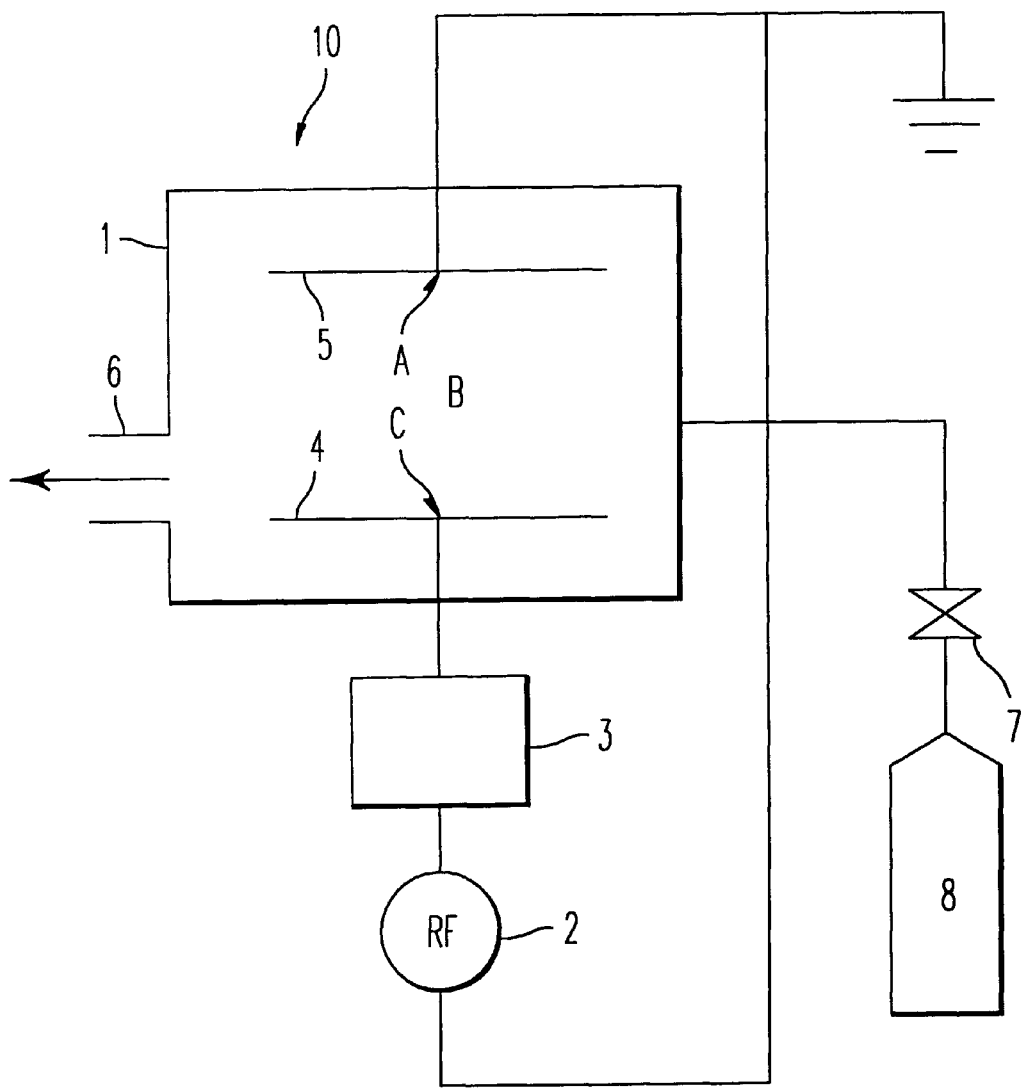
FIG. 1 is a schematic cross-sectional view illustrating an embodiment of a RF bombardment apparatus to be used for the surface treatment of the PFA film of the present invention.

The PFA film having certain specific functional groups (hydroxyl groups and carbonyl groups) introduced to its surface by the surface treatment, can readily be laminated on a sheet or film of so-called plastic such as polyethylene, polypropylene, ABS, polystyrene, polyvinyl chloride, PET or acryl, by means of a synthetic resin type adhesive represented by an epoxy type adhesive, a silicon type adhesive, a polyurethane type adhesive, a urea type adhesive, a melamine type adhesive, a phenol resin type adhesive, a vinyl acetate type adhesive or a cyano acrylate type adhesive, an emulsion type adhesive represented by e.g. a vinyl acetate type resin dispersed in e.g. water, a hot melt adhesive represented by an ethylene-vinyl acetate type or a polyamide type, a synthetic rubber adhesive represented by chloroprene rubber, or a sticker represented by an acrylic type or a silicon type.

Further, the PFA film having certain specific functional groups (hydroxyl groups and carbonyl groups) introduced to its surface by the surface treatment, can also readily be laminated on a metal such as aluminum, stainless steel (hereinafter referred to SUS), galvanium steel sheet, galvanized sheet iron or iron, by means of the above mentioned adhesive.

Further, the PFA film having certain specific functional groups (hydroxyl groups and carbonyl groups) introduced to its surface by the surface treatment, can also be laminated on a fluorine resin such as PFA or ETFE (ethylene-tetrafluoroethylene copolymer) by means of the above mentioned adhesive.

Among these adhesives, particularly effective is an adhesive containing a thermoplastic polyester resin component.

A thermoplastic polyester resin is one obtainable by a dehydration condensation reaction of a dibasic acid with a diol. The dibasic acid may, for example, be an aliphatic dibasic acid such as adipic acid, azelaic acid, sebacic acid, succinic acid or suberic acid, or an aromatic dibasic acid such as isophthalic acid, terephthalic acid, o-phthalic acid or naphthalene dicarboxylic acid. The diol may, for example, be ethylene glycol, diethylene glycol, 1,4-butandiol, 1,6-hexanediol, or neopentyl glycol.

Such a polyester resin is synthesized preferably by a dehydration condensation reaction at about 240° C.

It is also possible to improve the properties as an adhesive by incorporating an additive to the thermoplastic polyester resin. The additive may, for example, be a flow-adjusting agent such as benzoin or dimethyl terephthalate.

Further, it is also possible to improve the adhesive strength by incorporating an isocyanate group-containing compound as a curing agent.

Further, it is also possible to improve the stickiness by subjecting the polyester resin to urethane-modification in order to improve the adhesive strength to a fiber substrate such as a woven fabric.

Further, such a polyester resin may be subjected to epoxy modification in order to bond an adhesive comprising the thermoplastic polyester resin component to both the surface-treated fluorine resin and metal.

This epoxy modification is carried out in such a manner that after synthesizing a polyester resin, terminal epoxy modification is carried out preferably by adding a predetermined amount of an epoxy resin of e.g. bisphenol A type, followed by reaction at about 180° C. This epoxy modification is not only effective to improve the adhesive strength to metal, but also very effective to improve the boiling water resistance and chemical resistance.

Such epoxy modification is carried out by adding an epoxy resin in an amount suitable for modifying the terminal carboxyl groups of the previously synthesized polyester resin to epoxy.

However, a preferred degree of addition of the epoxy resin varies depending upon the type of the substrate to be bonded with the above PFA film. For example, when the PFA film is to be bonded to metal, it is advisable to add the epoxy resin in an amount required to completely modify the terminal carboxyl groups or to add the epoxy resin excessively so that a free epoxy resin will be present which is not concerned with the modification to such an extent not to impair thermal fluidity of the epoxy-modified polyester resin during heating of the adhesive. On the other hand, when the PFA film is to be bonded with a soft vinyl chloride resin, modification by the epoxy resin may be slight.

The epoxy resin to be used for the epoxy modification may, for example, be a bisphenol A type resin having the above mentioned bisphenol structure, a hydrogenated bisphenol A type resin, a diol type resin having a bisphenol structure changed to a flexible methylene chain, or a glycol type resin having such a structure changed to an ether chain. By changing the structure of the epoxy resin, it is possible to optionally change the glass transition temperature of the adhesive during curing.

Among them, most effective is a bisphenol A type epoxy resin having an epoxy equivalent of from 500 to 1000.

Further, it is also possible to incorporate a curing agent to such an epoxy-modified polyester adhesive or a urethane-modified polyester adhesive. As such a curing agent, it is preferred to employ a polyisocyanate containing at least two isocyanate groups per molecule. An aromatic polyisocyanate such as tolylene diisocyanate or 4,4'-diphenylmethane diisocyanate or an aliphatic polyisocyanate such as hexamethylene diisocyanate, isophorone diisocyanate or xylene diisocyanate, or an adduct, buret or isocyanurate of such a polyisocyanate with trimethylol propane, may, for example, be also mentioned. A two-liquid type having a curing agent incorporated, has a pot life, and it is accordingly preferred to use a so-called blocked isocyanate which dissociates at a high temperature to provide a curing agent.

Further, methods for producing the above mentioned various polyester resins are not limited to those exemplified in the following Examples.

The coating thickness of the adhesive is preferably at least 3 μm as the coating thickness after drying. When a PFA film having a thickness of at most 500 μm is to be laminated, it is properly from 5 μm to 10 μm. Further, when a thick article having a thickness of at least 500 μm is to be bonded, a thickness of about 20 μm will be required.

The bonding method is not particularly limited, but so-called dry lamination is preferred wherein lamination is carried out after evaporating the solvent after coating the adhesive. The adhesive strength will further be increased by passing the object between nip rolls kept at a temperature of at least the temperature for drying the solvent, at the time of the lamination.

Further, it is also possible to add an additive such as a pigment, a leveling agent, a defoaming agent or an ultraviolet absorber to such an adhesive.

As a surface treatment method of a PFA film, RF bombardment treatment is preferably employed. Under a reduced pressure, if a radio frequency (RF) voltage is applied between opposing electrodes to let RF discharge occur, a thin gas plasma will be formed in the space between the electrodes. The plasma contains active species such as radical atoms or ions, which will collide against a substrate disposed in the plasma or on the electrodes, whereby the surface state of the substrate can be physically and chemically changed. A method of utilizing this effect for modification of the surface state, is called RF bombardment treatment. The treated state changes depending upon e.g. the gas type, the gas pressure, the applied electric power, the distance between electrodes and the position of the substrate. For improving the adhesion between the PFA film and the adhesive for lamination, treatment with Ar gas is suitable, and addition of $H_2O$ is effective, but treatment with $O_2$ is unsuitable. The applied electric power is preferably from 0.01 to 0.5 $W/cm^2$ as the power density, and the treating time is preferably from 5 to 300 seconds, more preferably from 5 to 180 seconds. These conditions are very mild conditions as compared with already reported RF sputtering treatment, but they are sufficient for formation of functional groups on the surface. On the contrary, if the conditions are too strong or too long, damages adverse to improvement of the adhesion are likely to result, such that the surface will be excessively roughened, or a change in the composition will take place. By carrying out the RF bombardment treatment of the present invention, it is possible to obtain a PFA film having a surface which has functional groups i.e. hydroxyl groups and carbonyl groups and which is excellent in moisture resistance and provides a very high adhesion practically sufficient by a combination with an adhesive for lamination. This is considered to be such that by the treatment in vacuum, C–F bonds on the PFA surface will break and react with water upon exposure to the atmosphere to form hydroxyl groups and carbonyl groups which are oxygen-containing functional groups.

Further, DC bombardment treatment can also be preferably employed as a method for surface treatment of a PFA film. This is a treatment having RF in RF bombardment treatment changed to DC, whereby similar effects can be obtained. In the DC bombardment treatment, a direct current voltage is applied between opposing electrodes to let a plasma form, and by utilizing this plasma, the surface is physically and chemically changed. In the DC bombardment treatment, the apparatus is simple as compared with RF bombardment treatment, and can easily be large-sized, thus suitable for mass production, but some elaboration is required for the conditions of the apparatus. According to the RF bombardment treatment and the DC bombardment treatment, continuous treatment of roll-to-roll system can be carried out, whereby the mass productivity can be increased.

The present invention provides a process for producing a laminate, which comprises coating an adhesive containing a thermoplastic polyester resin component as the main component, on either one of a long substrate and a long PFA film having its surface RF bombardment-treated or DC bombardment-treated, then drying the adhesive, and thereafter, bonding the long substrate and the RF bombardment-treated long PFA film by the adhesive containing the thermoplastic polyester resin component as the main component, to form a long laminate by a dry lamination method. Preferably, such RF bombardment treatment and DC bombardment treatment are carried out by using Ar gas. As the long substrate, a plastic sheet of e.g. polyvinyl chloride, polyester or polyethylene, or a metal sheet such as a stainless steel (SUS) sheet, a galvanized sheet iron, a galvanium steel sheet or an aluminum sheet, may, for example, be preferably employed.

Figure 7:
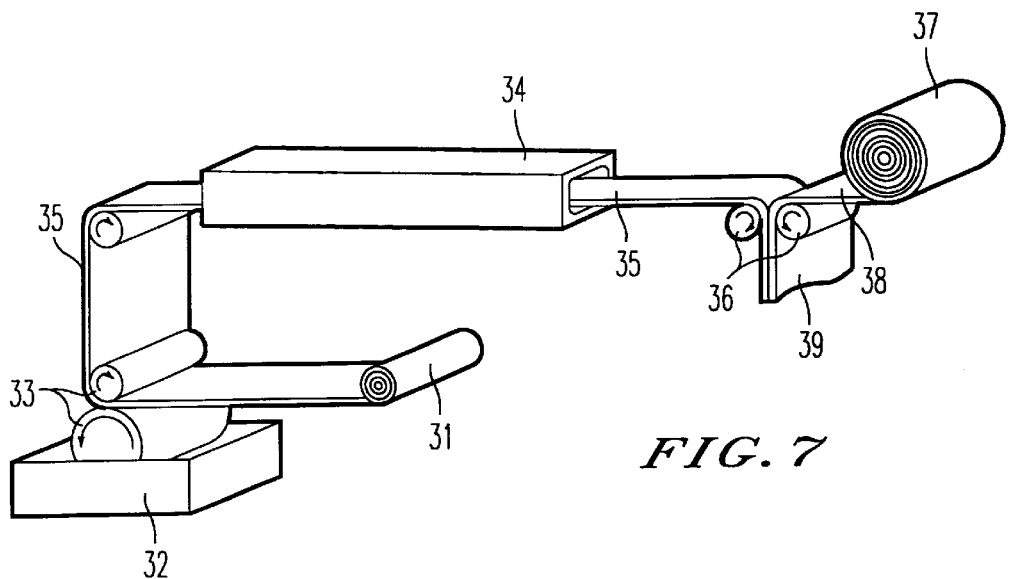
FIG. 7 is a schematic perspective view illustrating the apparatus and the process for producing a laminate of the PFA film and a soft vinyl chloride film.

At present, no product is available which has been prepared by laminating a PFA film on a plastic sheet of e.g. polyvinyl chloride, polyester or polyethylene, by a dry lamination method. According to the process for producing a laminate of the present invention, it is possible to bond a PFA film and a plastic film by a common dry lamination method as illustrated in FIG. 7. According to the process for producing a laminate of the present invention, lamination will be possible at a line speed of from 5 m/min to 40 m/min, and thus the method has adequate operation efficiency. At the time of the lamination, it is preferred to pass through nip rolls, and the linear pressure at that time is preferably from 5 kgf/cm to 10 kgf/cm. The laminated product thus obtained is preferably subjected to thermal curing, but adequate adhesive strength can be obtained even by room temperature curing at a level of 25° C. Further, the substrate laminated with the PFA film by this lamination method is not limited to a plastic containing no fluorine such as polyvinyl chloride, polyester, polypropylene or an acrylic resin, and various fluorine resins may also be laminated.

Further, as a method for laminating a PFA film on metal, a method has been proposed in which a primer consisting of a mixture of a fluorine resin and a heat resistant resin, is coated on a steel sheet side, and the steel sheet is heated at a temperature close to 400° C. to continuously laminate this primer layer and the PFA film to the metal sheet while melting the PFA film (JP-A-5-162243). However, this method requires heating at a temperature of at least the melting point (300° C.) of the PFA film, and yet, in order to improve the adhesion of the primer layer and the PFA film, so-called post baking is required which is baking after lamination at a temperature exceeding 300° C. Thus the method is economically disadvantageous. As a method for laminating a PFA film on metal at a temperature of at most 300° C. at which the PFA film melts, a method has been proposed in which an epoxy type adhesive which requires pressuring for 20 hours, is used for bonding SUS 304 and a PFA sheet treated in a mixed gas of $H_2/N_2$ (JP-A-6-220231). However, by this method, continuous production of the laminated product is difficult, and the productivity is very low. Further, at the time of bending of the laminated product, the epoxy resin does not follow the elongation of the PFA film or the steel sheet, whereby cracks are likely to form at the bent portion.

Figure 8:
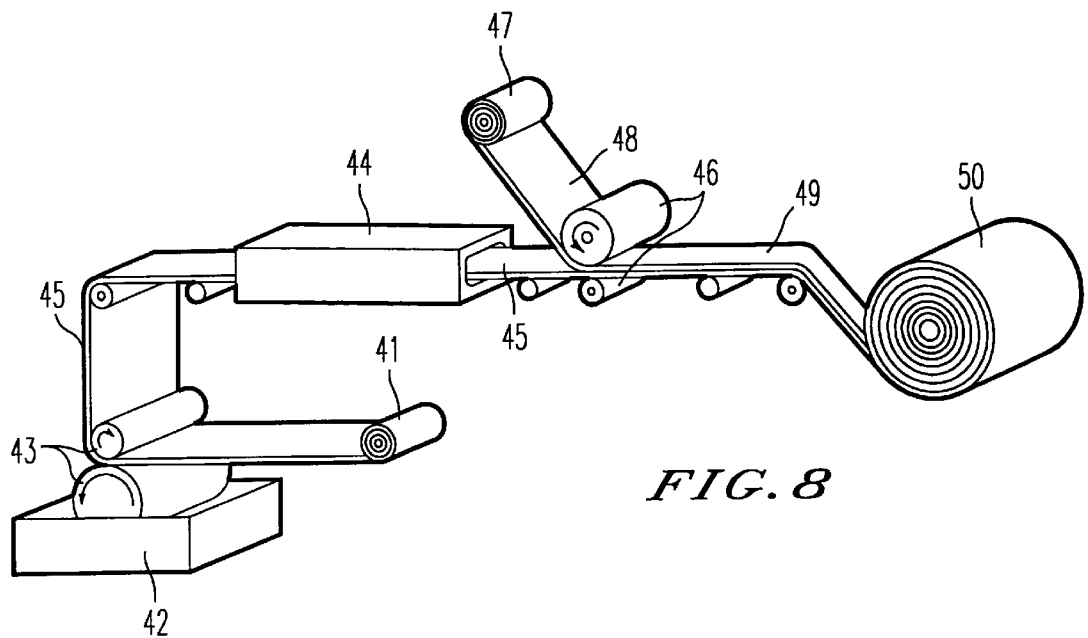
FIG. 8 is a schematic perspective view illustrating the apparatus and the process for producing a laminate of the PFA film and a SUS sheet.

Whereas, according to the process for producing the laminate of the present invention, it is possible to bond a PFA film and a metal sheet by a common dry lamination method as illustrated, for example, in FIG. 8. By this process, lamination is possible at a line speed of from 5 m/min to 40 m/min, and thus the process has the sufficient operation efficiency. Further, no curing after the lamination is required. At the time of the lamination, it is preferred to let the object pass through nip rolls. If nip rolls are used in the process for producing the laminate, after coating the adhesive to the metal sheet and drying it, the PFA film and the metal sheet can be bonded simply by nipping them by the nip rolls, and thus the process is excellent in the mass productivity. The adhesive to be used for the process for producing the laminate, is an adhesive containing a thermoplastic polyester resin component as the main component, and thus the adhesive sufficiently follows the elongation of the PFA film or the steel sheet even at the time of bending processing of the laminated product. Further, it is not a thermosetting resin such as an epoxy resin alone, the drying conditions for the adhesive are wide, and a temperature range of about 100° C. from the temperature (70 to 120° C.) at which the resin starts to melt, to the temperature at which the thermal decomposition occurs, can be used as proper drying conditions. The substrate to be laminated with the PFA film by this lamination process may, for example, be a stainless steel (SUS) sheet, a galvanized sheet iron, a galvanium steel sheet or aluminum.

Further, the laminated product produced by the present invention, for example, a laminated product of a PFA film with polyvinyl chloride, is preferably used as a unit bath wall material, a coated booth wall material, a wall sheet, etc., a laminated product of a PFA film with stainless steel is preferably used for a top plate of a gas cooking stove or a hood of a range, and a laminated product of a PFA film with aluminum is preferably used for an inner pan of a rice boiler or a front panel of kitchen.

EXAMPLES

Now, Examples of the present invention will be described.

Examples 1 to 16, and Comparative Examples 1 and 2

FIG. 1 is a schematic cross-sectional view illustrating the RF bombardment apparatus used for the surface treatment of PFA films in these Examples 1 to 16 and Comparative Examples 1 and 2. 1 is a reduced pressure container, 2 is a RF power source, 3 is a matching box, 4 is an electrode, 5 is a counter electrode, 6 is a discharge outlet, 7 is an atmosphere gas inlet valve, 8 is a gas bomb, and 10 is a RF bombardment apparatus.

In the reduced gas container 1, the electrode 4 and the counter electrode 5 are opposingly disposed. The counter electrode 5 is earthed, and the electrode 4 is connected to the RF power source 2 via the matching box 3. From the gas bomb 8, an atmosphere gas is supplied to the reduced pressure container 1 via the atmosphere gas inlet valve 7, and the interior of the reduced pressure container 1 is evacuated by a vacuum pump (not shown) via the discharge outlet 6 and maintained under a predetermined pressure. A PFA film (Aflex PFA, tradename, manufactured by Asahi Glass, thickness: 50 $\mu$m) to be subjected to surface treatment, was placed at any one of positions of above the counter electrode 5 (hereinafter referred to as substrate position A), above the electrode 4 (hereinafter referred to as substrate position C) and an intermediate position (hereinafter referred to as substrate position B) between the electrode 4 and the counter electrode 5. The distance between the electrode and the counter electrode 5 was 8 cm. The atmosphere gas introduced into the reduced pressure container 1 was Ar in Examples 1 to 16, and $O_2$ in Comparative Examples 1 and 2. The pressure in the reduced pressure container 1 was any one of 0.05 Torr, 0.1 Torr and 0.005 Torr. Between the electrode 4 and the counter electrode 5, a radio frequency voltage of 13.56 MHz was applied. The RF power density was any one of 0.16 W/cm$^2$, 0.06 W/cm$^2$ and 0.42 W/cm$^2$. The treating time was either one of 3 minutes and 0.5 minute. Under the conditions as shown in Table 1, with respect to Examples 1 to 16 and Comparative Examples 1 and 2, the respectively surface-treated PFA films were obtained.

Then, using as dibasic acids, 50 mol % of terephthalic acid, 30 mol % of isophthalic acid and 20 mol % of suberic acid, and as diols, 30 mol % of ethylene glycol and 70 mol % of 1,4-butanediol, they were reacted at 240° C. for 10 hours to obtain a polyester resin having a number average molecular weight of 30000. The acid value of this polyester resin was 3. Then, to 100 g of the polyester resin obtained by the above reaction, 4 g of a bisphenol A type epoxy resin having an epoxy equivalent of 700, which is an amount required for the terminal epoxy modification, was added, followed by a reaction at 180° C. for 3 hours, to obtain a polyester resin having all terminal carboxyl groups epoxy-modified. This resin was dissolved in methyl ethyl ketone, to prepare the main agent for an adhesive having a solid content of 50%. This adhesive will hereinafter be referred to as adhesive A.

On the other hand, using as dibasic acids, 50 mol % of terephthalic acid, 30 mol % of isophthalic acid and 20 mol % of suberic acid, and as diols, 20 mol % of ethylene glycol and 80 mol % of neopentyl glycol, they were reacted at 240° C. for 10 hours to obtain a polyester resin having a number average molecular weight of 30000, and this resin was used as adhesive B.

To each PFA film surface-treated as described above, adhesive A or B was coated in a thickness of 50 $\mu$m by an applicator and dried at 70° C. for two minutes to obtain an adhesive layer having a thickness of 15 $\mu$m after drying.

Then, each PFA film and transparent polyvinyl chloride (thickness: 200 $\mu$m) were laminated under a linear pressure of 10 kgf/cm, at 120° C. for one second in the case where adhesive A was used, or at 70° C. for one second in the case where adhesive B was used.

After the lamination, post curing was carried out at 70° C. for 10 hours, a T-peel test was carried out at a pulling speed of 50 mm/min to measure adhesive strength between the PFA film and the transparent polyvinyl chloride, with respect to Examples 1 to 16 and Comparative Examples 1 and 2.

On the other hand, after the lamination, post curing was carried out at 70° C. for 10 hours, and then boiling was carried out for 5 hours. Thereafter, the boiled product was left to stand at room temperature for one day, and then a T-peel test was carried out at a pulling speed of 50 mm/min to measure the adhesive strength of the PFA film and the transparent polyvinyl chloride with respect to Examples 1 to 16 and Comparative Examples 1 and 2.

The results of the foregoing are shown in Table 1. The unit for the adhesive strength is gf/cm. Further, in Table 1, the numeral in the bracket ( ) indicates the adhesive strength between the transparent polyvinyl chloride and the PFA film after boiling for 5 hours, followed by being left at room temperature for one day.

From Table 1, it is evident that each of Examples 1 to 16 of the present invention exhibits excellent adhesion. Further, it is evident that even after boiling, each of Examples 1 to 16 maintains excellent adhesion. Whereas, in Comparative Examples 1 and 2 wherein the atmosphere gas was $O_2$, the adhesive strength was low.

TABLE 1

| | Film-treating conditions | | | | | Bonding conditions | | Adhesive |
| --- | --- | --- | --- | --- | --- | --- | --- | --- |
| | Substrate position | Gas | Pressure (Torr) | Power density (W/cm$^2$) | Treating time (min) | Adhesive | Temp. (° C.) | strength (gf/cm) |
| Example 1 | C | Ar | 0.05 | 0.16 | 3 | B | 70 | 1050 (1020) |
| Example 2 | C | Ar | 0.05 | 0.16 | 3 | A | 120 | 1320 (1230) |
| Example 3 | C | Ar | 0.05 | 0.06 | 0.5 | B | 70 | 730 (630) |
| Example 4 | C | Ar | 0.05 | 0.06 | 0.5 | A | 120 | 1050 (1020) |
| Example 5 | C | Ar | 0.05 | 0.42 | 0.5 | B | 70 | 1140 (1060) |
| Example 6 | C | Ar | 0.05 | 0.42 | 0.5 | A | 120 | 1270 (1230) |
| Example 7 | C | Ar | 0.1 | 0.16 | 0.5 | B | 70 | 780 (700) |
| Example 8 | C | Ar | 0.1 | 0.16 | 0.5 | A | 120 | 1050 (960) |
| Example 9 | B | Ar | 0.05 | 0.16 | 0.5 | B | 70 | 970 (720) |
| Example 10 | B | Ar | 0.05 | 0.16 | 0.5 | A | 120 | 1050 (990) |
| Example 11 | A | Ar | 0.05 | 0.16 | 0.5 | B | 70 | 780 (690) |
| Example 12 | A | Ar | 0.05 | 0.16 | 0.5 | A | 120 | 1020 (960) |
| Example 13 | C | Ar | 0.05 | 0.16 | 0.5 | B | 70 | 850 (840) |
| Example 14 | C | Ar | 0.05 | 0.16 | 0.5 | A | 120 | 1110 (1050) |
| Example 15 | C | Ar | 0.005 | 0.16 | 0.5 | B | 70 | 1050 (1000) |
| Example 16 | C | Ar | 0.005 | 0.16 | 0.5 | A | 120 | 1500 (1500) |
| Comparative Example 1 | C | O$_2$ | 0.05 | 0.16 | 0.5 | B | 70 | 280 (100) |
| Comparative Example 2 | C | O$_2$ | 0.05 | 0.16 | 0.5 | A | 120 | 120 (60) |

Examples 17 to 32

Figure 2:
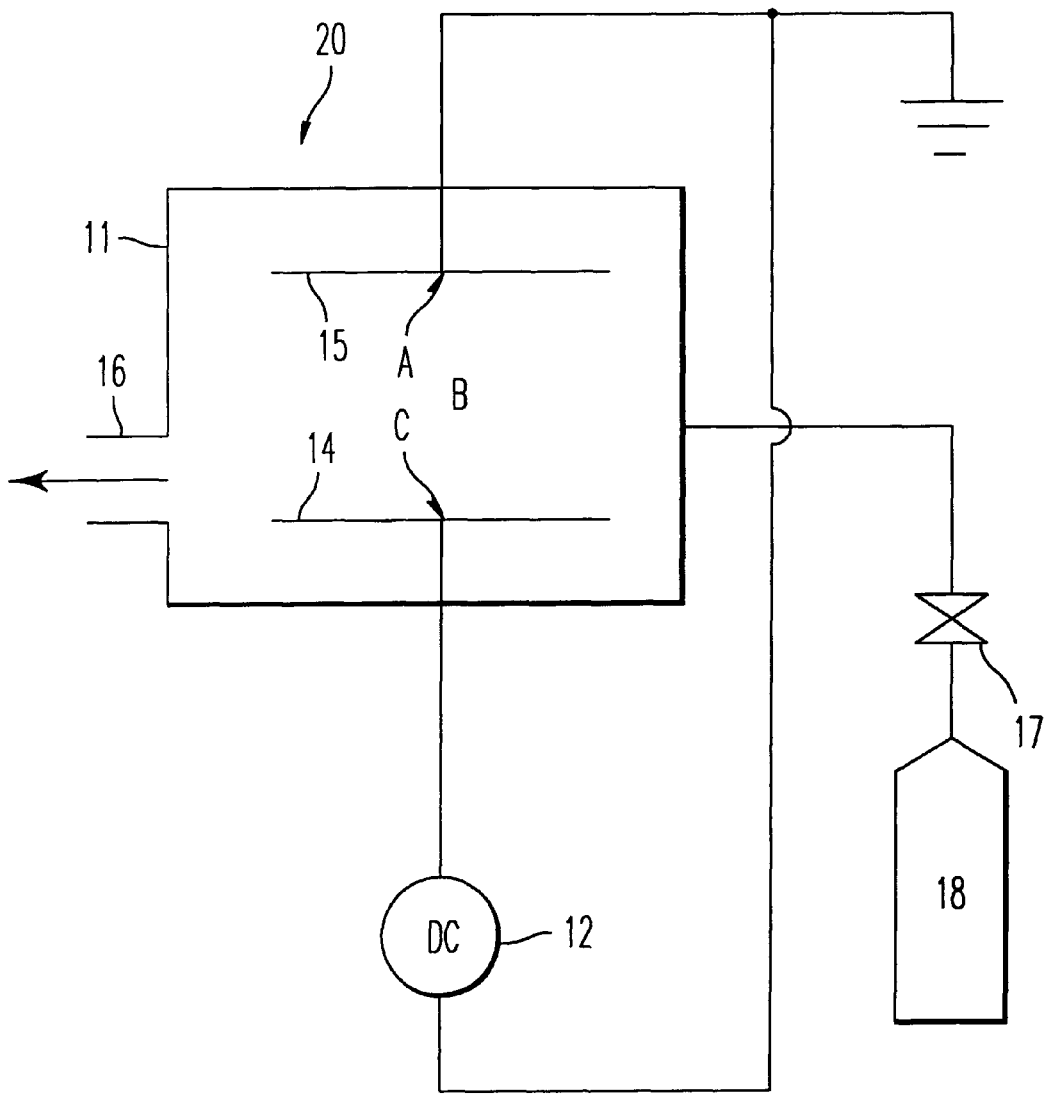
FIG. 2 is a schematic cross-sectional view illustrating an embodiment of a DC bombardment apparatus to be used for the surface treatment of the PFA film of the present invention.

FIG. 2 is a schematic cross-sectional view illustrating the DC bombardment apparatus used for the surface treatment of PFA films in these Examples 17 to 32. 11 is a reduced pressure container, 14 is an electrode, 15 is a counter electrode, 16 is a discharge outlet, 17 is an atmosphere gas inlet valve, 18 is a gas bomb, 12 is a DC power source, and 20 is a DC bombardment apparatus.

In the reduced pressure container 11, the electrode 14 and the counter electrode 15 are opposingly disposed. The counter electrode 15 is earthed, and the electrode 14 is connected to the DC power source 12. From the gas bomb 18, an atmosphere gas is supplied to the reduced pressure container 11 via the atmosphere gas inlet valve 17, and the interior of the reduced pressure container 11 is evacuated by a vacuum pump (not shown) via the discharge outlet 16 and maintained under a predetermined pressure. A PFA film (Aflex PFA, tradename, manufactured by Asahi Glass, thickness: 50 μm) to be subjected to surface treatment, was placed at any one of positions of above the counter electrode 15 (hereinafter referred to as substrate position A), above the electrode 14 (hereinafter referred to as substrate position C) and an intermediate position (hereinafter referred to as substrate position B) between the substrate 14 and the counter substrate 15. The distance between the electrode 14 and the counter substrate 15 was 8 cm. The atmosphere gas introduced into the reduced pressure container 11 was Ar. The pressure in the reduced pressure container 11 was any one of 0.5 Torr, 0.05 Torr and 0.005 Torr. A direct current voltage was applied between the electrode 14 and the counter substrate 15. The DC power density was any one of 0.06 W/cm$^2$, 0.16 W/cm$^2$ and 0.42 W/cm$^2$. The treating time was either one of 3 minutes and 0.5 minute. Under the conditions shown in Table 2, with respect to Examples 17 to 32, the respective surface-treated PFA films were obtained.

In the same manner as in Examples 1 to 16, these films were bonded with transparent polyvinyl chloride by means of adhesive A or B, and the adhesive strength, and the adhesive strength after boiling treatment for 5 hours, followed by being left at room temperature for one day, were measured, and the results are shown in Table 2. Further, the adhesive strength after the boiling treatment for 5 hours, followed by being left at room temperature for one day, is shown in the bracket ( ).

From Table 2, it is evident that each of Examples 17 to 32 of the present invention exhibits excellent adhesion. Further, it is evident that even after boiling, each of Examples 17 to 32 maintains excellent adhesion.

TABLE 2

| | Film-treating conditions | | | | | Bonding conditions | | Adhesive |
| --- | --- | --- | --- | --- | --- | --- | --- | --- |
| | Substrate position | Gas | Pressure (Torr) | Power density (W/cm$^2$) | Treating time (min) | Adhesive | Temp. (° C.) | strength (gf/cm) |
| Example 17 | A | Ar | 0.05 | 0.16 | 3 | B | 70 | 1040 (1010) |
| Example 18 | A | Ar | 0.05 | 0.16 | 3 | A | 120 | 1130 (1110) |
| Example 19 | A | Ar | 0.05 | 0.06 | 0.5 | B | 70 | 980 (950) |
| Example 20 | A | Ar | 0.05 | 0.06 | 0.5 | A | 120 | 1230 (1210) |
| Example 21 | A | Ar | 0.05 | 0.42 | 0.5 | B | 70 | 1160 (1130) |
| Example 22 | A | Ar | 0.05 | 0.42 | 0.5 | A | 120 | 1170 (1090) |
| Example 23 | A | Ar | 0.5 | 0.16 | 0.5 | B | 70 | 990 (970) |
| Example 24 | A | Ar | 0.5 | 0.16 | 0.5 | A | 120 | 1030 (1000) |
| Example 25 | B | Ar | 0.05 | 0.16 | 0.5 | B | 70 | 950 (910) |

TABLE 2-continued

| | Film-treating conditions | | | | | Bonding conditions | | Adhesive strength (gf/cm) |
|---|---|---|---|---|---|---|---|---|
| | Substrate position | Gas | Pressure (Torr) | Power density (W/cm$^2$) | Treating time (min) | Adhesive | Temp. (° C.) | |
| Example 26 | B | Ar | 0.05 | 0.16 | 0.5 | A | 120 | 1140 (1080) |
| Example 27 | C | Ar | 0.05 | 0.16 | 0.5 | B | 70 | 1070 (1050) |
| Example 28 | C | Ar | 0.05 | 0.16 | 0.5 | A | 120 | 1220 (1160) |
| Example 29 | A | Ar | 0.05 | 0.16 | 0.5 | B | 70 | 1010 (950) |
| Example 30 | A | Ar | 0.05 | 0.16 | 0.5 | A | 120 | 1110 (1070) |
| Example 31 | A | Ar | 0.005 | 0.16 | 0.5 | B | 70 | 1050 (1050) |
| Example 32 | A | Ar | 0.005 | 0.16 | 0.5 | A | 120 | 1250 (1250) |

Examples 33 and 34 and Comparative Example 3

Then, the relation between the adhesive strength and functional groups on the surface of the surface-treated PFA film, was examined. The functional groups on the surface were identified by an ESCA (Electron Spectroscopy for Chemical Analysis) method and a chemical modification method.

In the ESCA method, peaks of $O^{1s}$ and $C_{1s}$ on the surface of the surface-treated PFA film, were measured, and from their chemical shifts, the functional groups were identified. In the measurement of the chemical shifts, the peaks were separated into the respective components by fitting with the Gauss-Lawrence function, and from the chemical shifts of the separated respective components, the respective functional groups were identified. The correspondence of a chemical shift and a functional group was carried out by calculating the orbital energy of a unit structure molecule by a molecular orbit method (ab-initio method).

In the chemical modification method, a reagent containing a hetero atom which selectively reacts with a certain specific functional group, was reacted and attached to the surface of the surface-treated PFA film, and the presence or absence of a hetero atom at the surface of the PFA film, was measured by ESCA, whereby measurement of the presence or absence of the specific functional group was carried out.

Identification of a hydroxyl group was carried out by immersing the surface-treated PFA film in an (i-PrO)$_2$Ti(acac) solution for 15 hours, then washing the film with acetone, analyzing the surface of the washed PFA film by ESCA to examine presence or absence of Ti on the surface. Here, Pr represents propyl, and acac represents actylacetone. If a hydroxyl group is present on the surface, the following reaction will take place:

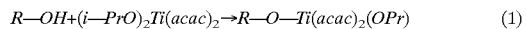

$$R-OH+(i-PrO)_2Ti(acac)_2 \rightarrow R-O-Ti(acac)_2(OPr) \quad (1)$$

Therefore, even after washing with acetone, Ti will be present at the surface of the PFA film.

Identification of a carbonyl group was carried out by exposing the surface-treated PFA film to a vapor of an aqueous hydrazine solution (1:1) for 10 minutes, and then analyzing the surface of the PFA film by ESCA to examine presence or absence of N on the surface. If a carbonyl group is present on the surface, the following reaction will take place, thus indicating the presence of N on the surface of the PFA film:

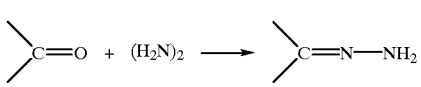

(2)

Identification of an epoxy group was carried out by exposing the surface-treated PFA film to a vapor of conc. HCl (12N) for 10 minutes and then analyzing the surface of the PFA film by ESCA to examine presence or absence of Cl on the surface. If an epoxy group is present on the surface, the following reaction takes place, thus indicating the presence of Cl on the surface of the PFA film:

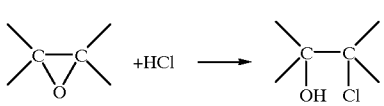

(3)

Figure 3:
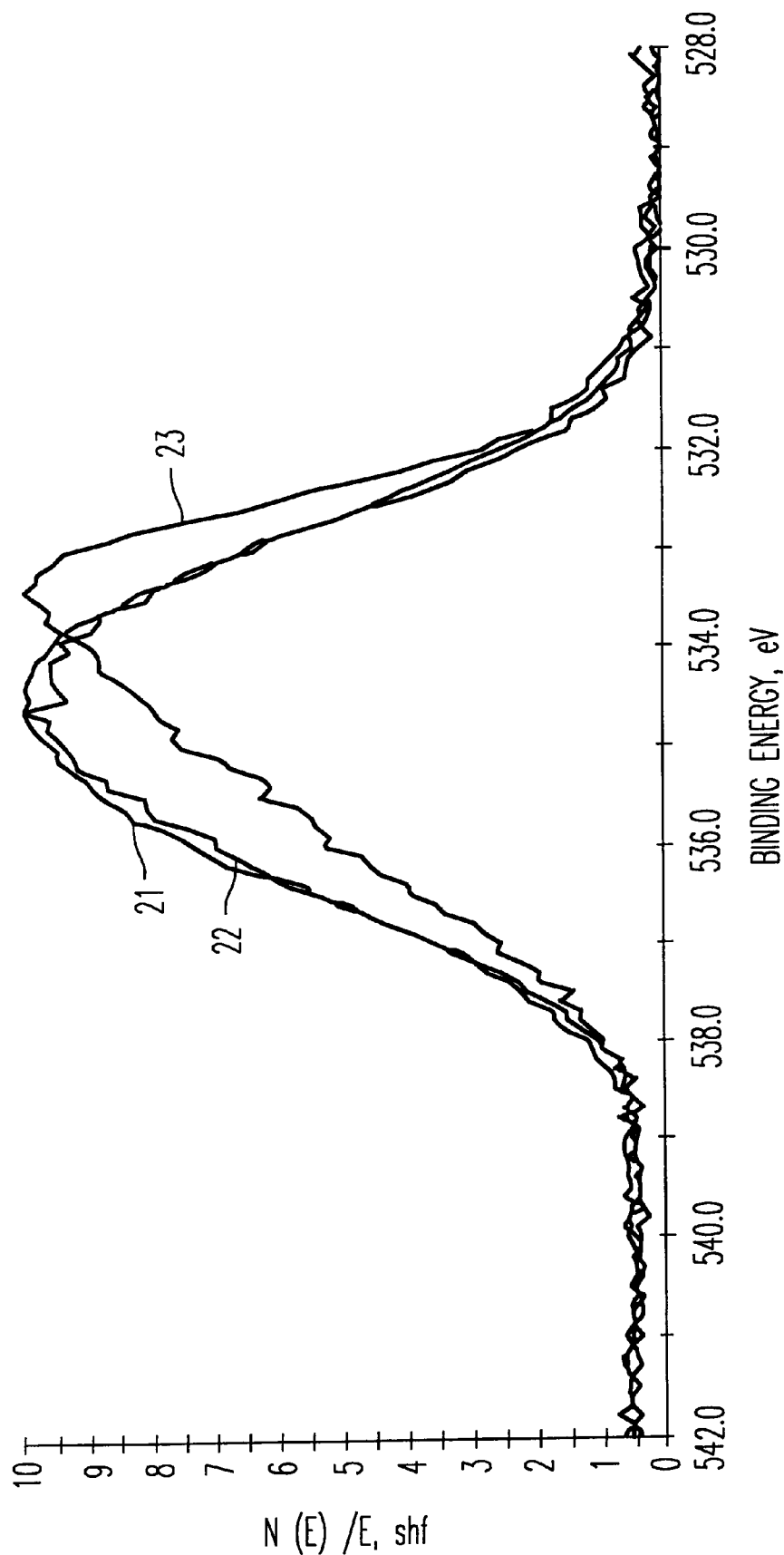
FIG. 3 is a graph showing an ESCA spectrum of the surface of the surface-treated PFA film.

In the same manner as in Examples 1 to 16, surface treatment of PFA films were carried out to obtain PFA films of Examples 33 and 34. The surfaces of these PFA films were measured by ESCA, and the results are shown in FIG. 3. The peak 21 is a spectrum of $O_{1s}$ of the PFA film of Example 33, and peak 22 is a spectrum of $O_{1s}$ of the PFA film of Example 34. Each of the peaks 21 and 22 had its peak top within a bonding energy range of from 534 to 535 eV. Then, these peaks were separated into the respective components by fitting with the Gauss-Lawrence function, and the respective functional groups were identified from the chemical shifts of the separated respective components, whereby it was found that hydroxyl groups and carbonyl groups were mainly present.

Then, functional groups of these PFA films of Examples 33 and 34 were identified by the chemical modification method. The PFA films of Examples 33 and 34 were, respectively, immersed in an (i-PrO)$_2$Ti(acac) solution for 15 hours and then washed with acetone. The surfaces of the washed PFA films were analyzed by ESCA to investigate presence or absence of Ti on the film surfaces, whereby with the PFA film of each of Examples 33 and 34, Ti was observed, and thus, it was found that hydroxyl groups were present on the surfaces of the PFA films of Examples 33 and 34.

Further, the PFA films of Examples 33 and 34 were exposed to a vapor of an aqueous hydrazine solution (1:1) for 30 minutes, and then the surfaces of the PFA films were analyzed by ESCA to examine presence or absence of N on the surfaces, whereby with the PFA film of each of Examples 33 and 34, N was observed, and thus it was found that carbonyl groups were present on the surfaces of the PFA films of Examples 33 and 34.

Further, the PFA films of Examples 33 and 34 were exposed to a vapor of conc. HCl (12N) for 10 minutes, and then the surfaces of the PFA films were analyzed by ESCA to examine presence or absence of Cl on the surfaces, thereby to examine epoxy groups on the surface of the PFA films, whereby it was found that the epoxy groups were at most 10 mol % of the total oxygen-containing functional groups.

Then, using the above mentioned adhesive A, the adhesive strength of the PFA films of Examples 33 and 34 with transparent polyvinyl chloride having a thickness of 200 μm, was measured in the same manner as in Examples 1 to 16. With respect to the PFA film of Example 33, a value of 1110 gf/cm was obtained, and with respect to the PFA film of Example 34, a value of 1020 gf/cm was obtained. Thus, each showed high adhesive strength.

Peak 23 in FIG. 3 shows a spectrum of $O_{1s}$ of the PFA film (Comparative Example 3) having an adhesive strength of 30 gf/cm with the transparent polyvinyl chloride. As compared with the PFA films of Examples 33 and 34 showing excellent adhesion, the bonding energy of $O_{1s}$ is substantially different, thus indicating that the functional groups at the PFA film surface are different from Examples 33 and 34.

Further, the apparatus used for the measurement by ESCA was 5500 model, manufactured by PHI Company, whereby as an X-ray source, monochromatic Al Kα-rays were used at 14 kV with 500 W, the X-ray irradiation area was 7 mm×2 mm, the analytical area (photo-electron detecting area) was 0.8 mmφ, the photo-electron detecting angle was 70°, the neutral electron ray energy was 0.1 eV, and the Pass Energy of photo-electron was 23.5 eV. Further, with respect to the value of a chemical shift, correction of the abscissa (bond energy) was carried out based on C (292.8 eV) and F (690.3 eV) of the —$CF_2$— chain being the main unit of PFA.

Examples 35 and 36 and Comparative Example 4

Then, the relation between the adhesive strength and the surface irregularity state of the surface-treated PFA film, was examined.

Figure 4:
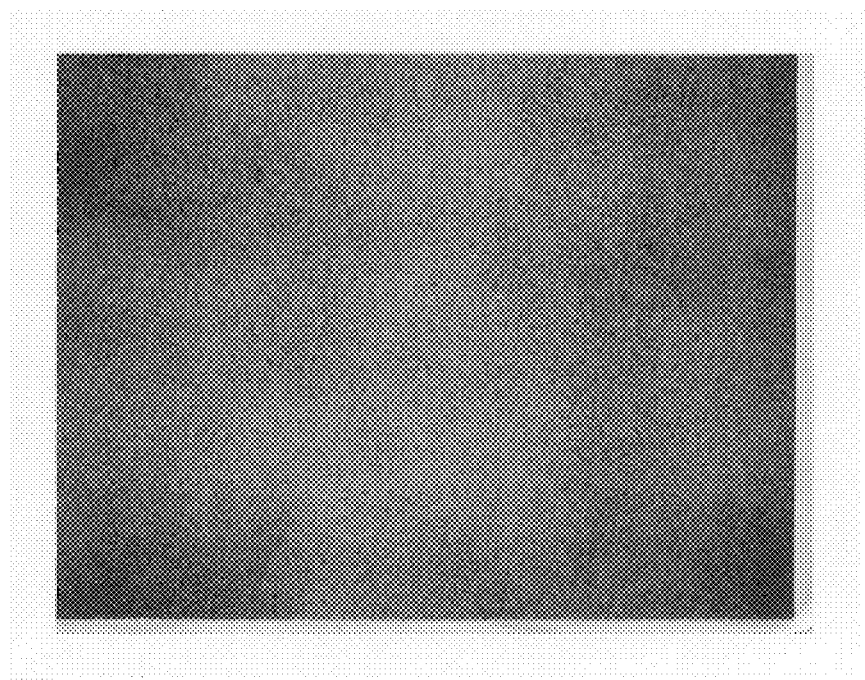
FIG. 4 is a microscopic photograph of the surface of the surface-treated PFA film.
Figure 5:
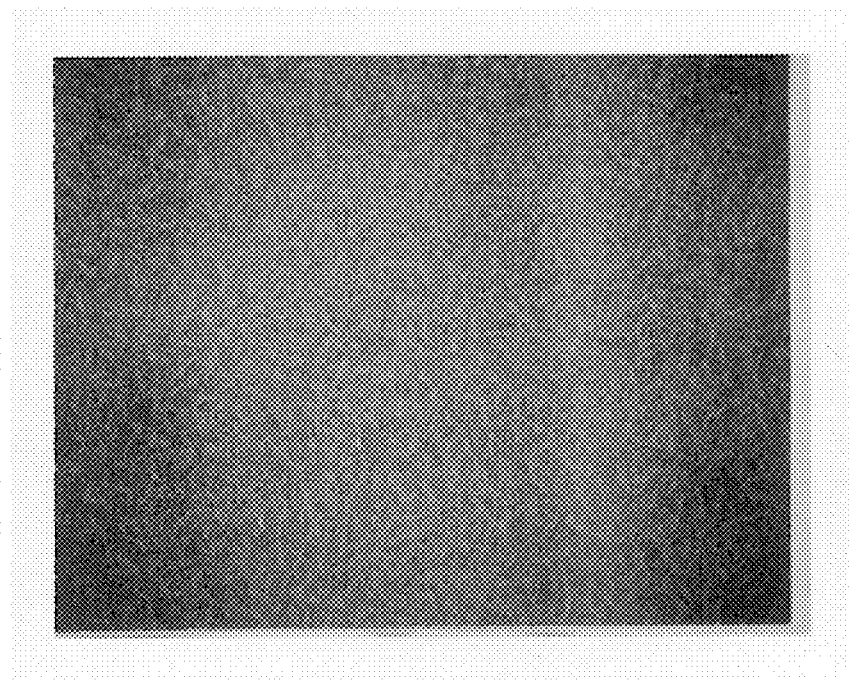
FIG. 5 is a microscopic photograph of the surface of the surface-treated PFA film.

In the same manner as in Examples 1 to 16, surface treatment of PFA films were carried out to obtain PFA films of Examples 35 and 36. The surfaces of these PFA films were observed by SEM, and the results are shown in FIGS. 4 and 5, respectively. The magnification was 40,000 times in each case. From these SEM photographs, it is evident that in each PFA film, there is no substantial irregularities on its surface.

The average surface roughness ($R_a$ as defined by JIS B 0601) of the PFA films of Examples 35 and 36 was measured by a non-contact dynamic mode by means of AFM (Atomic Force Microscope), whereby it was 3.8 nm with respect to the PFA film of Example 35 shown in FIG. 4, and it was 5.1 nm with respect to the PFA film of Example 36 shown in FIG. 5.

Then, using the above mentioned adhesive A, the adhesive strength of the PFA films of Examples 35 and 36 with transparent polyvinyl chloride having a thickness of 200 μm, was measured in the same manner as in Examples 1 to 16. With respect to the PFA film of Example 35, a value of 1110 gf/cm was obtained, and with respect to the PFA film of Example 36, a value of 1000 gf/cm was obtained. Thus, each showed high adhesive strength.

Figure 6:
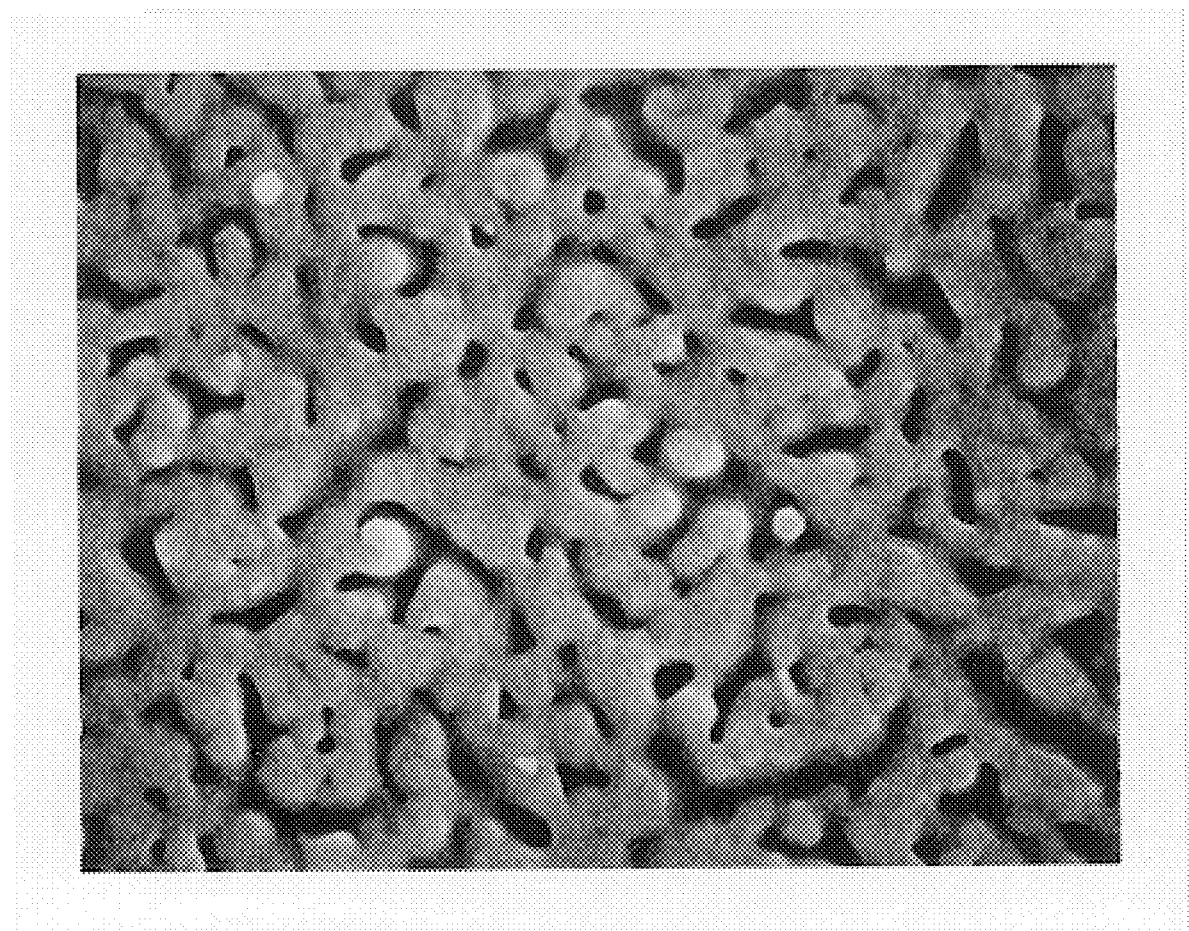
FIG. 6 is a microscopic photograph of the surface of the surface-treated PFA film.

The SEM image of FIG. 6 is a SEM image (magnification: 40,000 times) of the PFA film (Comparative Example 4) having an adhesive strength of 70 gf/cm with transparent polyvinyl chloride. While no substantial surface irregularities were observed in the SEM images of Examples 35 and 36 showing excellent adhesion, in this Comparative Example 4, it is evident that irregularities are present on the surface. Further, the average surface roughness of the PFA film of this Comparative Example 4 was measured by means of AFM, whereby it was 20.6 nm.

Example 37

FIG. 7 is a schematic perspective view illustrating the apparatus and the process for producing a laminate of a PFA film with a soft polyvinyl chloride film. 31 is a PFA film roll, 32 is an adhesive vessel, 33 is a gravure roll, 34 is a drying furnace, 35 is a PFA film, 36 is nip rolls, 37 is a soft polyvinyl chloride roll, 38 is a soft polyvinyl chloride film, and 39 is a laminate.

Firstly, an adhesive in the adhesive vessel 32 is coated by the gravure roll 33 to the PFA film 35 supplied from the PFA film roll 31. Then, the adhesive is dried by the drying furnace 34, and the PFA film 35 provided with the adhesive after drying, and the soft polyvinyl chloride film 38 supplied from the soft polyvinyl chloride roll 37, are passed through the nip rolls 36 and laminated to prepare a laminate 39.

In this Example, firstly, using, as dibasic acids, 50 mol % of terephthalic acid, 30 mol % of isophthalic acid and 20 mol % of suberic acid, and as diols, 30 mol % of ethylene glycol and 70 mol % of 1,4-butanediol, they were reacted at 240° C. for 10 hours to obtain a polyester resin having a number average molecular weight of 30000. The acid value of this polyester resin was 3. Then, 4 g of a bisphenol A type epoxy resin having an epoxy equivalent of 700 in an amount required for the terminal epoxy modification, was added to 100 g of the polyester resin obtained by the above reaction, followed by a reaction at 180° C. for 3 hours, to obtain a polyester resin having all terminal carboxyl groups epoxy-modified. This resin was dissolved in methyl ethyl ketone to prepare a main agent for an adhesive having a solid content of 50%. This adhesive was the same as adhesive A used in Examples 1 to 16.

One side of the PFA film (Aflex PFA, tradename, manufactured by Asahi Glass) having a thickness of 50 μm, was subjected to RF bombardment treatment. The treating conditions were the same as in the above Examples 13 and 14. The wetting index was measured by means of a wetting index reagent of Wako Junyaku and found to be 40 dyne. The adhesive prepared as described above, was coated by the gravure roll 33 on the RF bombardment-treated surface of the PFA film 35 and then dried at 100° C. by the drying furnace 34 to obtain an adhesive layer having a thickness of 5 μm after drying.

Then, the PFA film 35 having this adhesive layer after drying and a soft polyvinyl chloride film 38 having a thickness of 200 μm were passed through the nip rolls 36 maintained at 130° C. and laminated. The linear pressure of the nip rolls 36 was 10 kgf/cm, and the laminating speed was 12 m/min. The laminate was left to stand at room temperature for one day, and then the T-peel test was carried out at a pulling speed of 20 mm/min, whereby the adhesive strength of 1200 gf/cm was shown. Further, this test piece was immersed in boiling water for 5 hours, and then the T-peel test was carried out at a pulling speed of 20 mm/min, whereby the adhesive strength was 1200 gf/cm, and no decrease in the adhesive strength was observed.

Example 38

FIG. 8 is a schematic perspective view illustrating the apparatus and the process for producing a laminate of a PFA film and a SUS sheet. 41 is a SUS sheet roll, 42 is an adhesive vessel, 43 is a gravure roll, 44 is a drying furnace, 45 is a SUS sheet, 46 is nip rolls, 47 is a PFA film roll, 48 is a PFA film, 49 is a laminate, and 50 is a laminate roll.

Firstly, an adhesive in the adhesive vessel 42 is coated by the gravure roll 43 to the SUS sheet 45 supplied from the SUS sheet roll 41. Then, the adhesive is dried by the drying furnace 44, and the SUS plate 45 provided with the adhesive after drying and the PFA film 48 supplied from the PFA film roll 47, are laminated by passing through the nip rolls 46 to prepare a laminate 49, which is finally wound up to obtain the laminated roll 50.

In this Example, firstly, one side of the PFA film (Aflex PFA, tradename, manufactured by Asahi Glass) having a thickness of 50 μm, was subjected to RF bombardment treatment. The treating conditions were the same as in the above Examples 13 and 14. The wetting index was measured by means of a wetting index reagent of Wako Junyaku and found to be 48 dyne. Then, the adhesive A prepared in Example 37 was coated by the gravure roll 43 on the SUS 430 sheet 45 degreased by acetone and dried at 200° C. in the drying furnace 44 to obtain an adhesive layer having a thickness of 5 μm after drying.

Then, the PFA film 48 treated by RF bombardment treatment as described above, and the SUS 430 sheet 45 coated with the adhesive, were laminated by passing through the nip rolls 46 maintained at 120° C. to obtain the laminate 49. The linear pressure of the nip rolls 46 was 10 kgf/cm, and the laminating speed was 12 m/min. After being left at room temperature for one day, a 180° peeling test was carried out at a pulling speed of 20 mm/min, whereby the adhesive strength was 1300 gf/cm. Further, this test specimen was subjected to immersion in boiling water for 5 hours in the same manner as in Example 37, whereupon the adhesive strength was 1400 gf/cm.

Example 39

Firstly, one side of a PFA film (Aflex PFA, tradename, manufactured by Asahi Glass) having a thickness of 50 μm, was subjected to RF bombardment treatment. The treating conditions were the same as in the above described Example 37.

On the other hand, using as dibasic acids, 50 mol % of terephthalic acid, 30 mol % of isophthalic acid and 20 mol % of suberic acid, and as a diol, ethylene glycol, they were reacted at 240° C. for 10 hours to obtain a polyester resin having a number average molecular weight of 30000. The acid value of this polyester resin was 3. Then, to 100 g of the polyester resin obtained by the above reaction, 40 g of a bisphenol A type epoxy resin having an epoxy equivalent of 700, which is the epoxy resin in an amount at least required by the terminal epoxy modification, was added, followed by a reaction at 180° C. for 3 hours, to obtain a mixture comprising a polyester resin having all terminal carboxyl groups epoxy-modified, and a free epoxy resin. This resin was dissolved in methyl ethyl ketone to prepare a main agent for an adhesive having a solid content of 50%.

Then, using as a curing agent an adduct of trimethylol propane with a tolylene diisocyanate having a solid content of 75% dissolved in ethyl acetate, the curing agent was added in an amount of 10 parts per 100 parts of the main agent to obtain an adhesive.

Then, the adhesive prepared as described above, was coated by the gravure roll 43 on the surface of a stainless steel 430 sheet 45 having a thickness of 0.5 mm degreased with acetone, and dried at 150° C. in the drying furnace 44 to obtain an adhesive layer having a thickness of 5 μm after drying.

Then, the RF bombardment-treated surface of this PFA film and the stainless steel 430 sheet 45 coated with the adhesive, were laminated by passing through the nip rolls 46 maintained at 180° C. The linear pressure of the nip rolls 46 was 10 kgf/cm, and the laminating speed was 20 m/min. The laminate was left to stand at room temperature for one day, whereupon a 180° peeling test was carried out at a pulling speed of 20 mm/min, whereby the adhesive strength was 1600 gf/cm. The immersion in boiling water for 5 hours was carried out in the same manner as in Example 37, whereby the adhesive strength was 1600 gf/cm.

Example 40

Firstly, using as dibasic acids, 50 mol % of terephthalic acid, 30 mol % of isophthalic acid and 20 mol % of suberic acid, and as diols, 20 mol % of ethylene glycol and 80 mol % of neopentyl glycol, they were reacted at 240° C. for 10 hours to obtain a polyester resin having a number average molecular weight of 30000. This adhesive was the same as adhesive B used in Examples 1 to 16.

The PFA film 35 was laminated with a soft polyvinyl chloride film 38 having a thickness of 200 μm in the same manner as in Example 37 except that this resin was used as the adhesive.

The laminate was left to stand at room temperature for one day, and then a T-peel test was carried out at a pulling speed of 20 mm/min, whereby the adhesive strength was 1000 gf/cm. The immersion in boiling water for 5 hours was carried out in the same manner as in Example 37, whereby the adhesive strength was 900 gf/cm.

Examples 41 and 42

Surface treatment of PFA films by DC bombardment treatment was carried out in the same manner as in Examples 17 to 32, to obtain PFA films of Examples 41 and 42. With respect to these films, the functional groups at the surfaces were identified by ESCA peak shifts and the chemical modification method in the same manner as in Examples 33 and 34, whereby it was found that hydroxyl groups and carbonyl groups were mainly present.

Then, using the above mentioned adhesive A in the same manner as in Examples 33 and 34, the adhesive strength of the PFA films of Examples 41 and 42 with transparent polyvinyl chloride having a thickness of 200 μm, was measured in the same manner as in Examples 1 to 16. With respect to the PFA film of Example 41, a value of 1010 gf/cm was obtained, and with respect to the PFA film of Example 42, a value of 1050 gf/cm was obtained. Thus, each showed high adhesive strength.

Examples 43 and 44

In the same manner as in Examples 17 to 32, surface treatment of PFA films by DC bombardment treatment was carried out to obtain PFA films of Examples 43 and 44. The surfaces of these PFA films were observed by SEM in the same manner as in Examples 35 and 36, whereby no substantial surface irregularities were observed.

The average surface roughness of the PFA films of Examples 43 and 44 was measured by means of AFM, whereby it was 4.1 nm with respect to the PFA film of Example 43 and 5.0 nm with respect to the PFA film of Example 44.

Further, using the above mentioned adhesive A, the adhesive strength with transparent polyvinyl chloride having a thickness of 200 μm, was measured in the same manner as in Examples 35 and 36. With respect to the PFA film of Example 43, a value of 1100 gf/cm was obtained, and with respect to the PFA film of Example 44, a value of 1030 gf/cm was obtained. Thus, each showed high adhesive strength.

Example 45

One side of a PFA film (Aflex PFA, tradename, manufactured by Asahi Glass) having a thickness of 50 μm, was subjected to DC bombardment treatment. The treating conditions were the same as in the above Examples 29 and 30. The wetting index was measured by a wetting index reagent of Wako Junyaku, whereby it was 43 dyne. In the same manner as in Example 37, it was laminated with a soft polyvinyl chloride film, and a T-peel test was carried out, whereby the adhesive strength was 1170 gf/cm. Further, this test piece was immersed in boiling water for 5 hours, and thereafter, a T-peel test was carried out, whereby the adhesive strength was 1160 gf/cm, and no decrease in the adhesive strength was observed.

Example 46

One side of a PFA film (Aflex PFA, tradename, manufactured by Asahi Glass) having a thickness of 50 μm, was subjected to DC bombardment treatment. The treating conditions were the same as in the above Examples 29 and 30. The wetting index was measured by a wetting index reagent of Wako Junyaku, whereby it was 43 dyne. In the same manner as in Example 38, the PFA film was laminated on a SUS sheet to obtain a laminate. It was left to stand at room temperature for one day, and then a 180° peeling test was carried out at a pulling speed of 20 mm/min, whereby the adhesive strength was 1320 gf/cm. Further, this test piece was subjected to immersion in boiling water for 5 hours in the same manner as in Example 45, whereby the adhesive strength was 1320 gf/cm.

Example 47

One side of a PFA film (Aflex PFA, tradename, manufactured by Asahi Glass) having a thickness of 50 μm, was subjected to DC bombardment treatment. The treating conditions were the same as the above Examples 29 and 30. The wetting index was measured by a wetting index reagent of Wako Junyaku, whereby it was 45 dyne. In the same manner as in Example 39, the PFA film and a stainless steel coated with an adhesive were laminated. The laminate was left to stand at room temperature for one day, and then a 180° peeling test was carried out at a pulling speed of 20 mm/min, whereby the adhesive strength was 1620 gf/cm. In the same manner as in Example 37, immersion in boiling water for 5 hours was carried out, whereupon the adhesive strength was 1590 gf/cm.

Example 48

One side of a PFA film (Aflex PFA, tradename, manufactured by Asahi Glass) having a thickness of 50 μm, was subjected to DC bombardment treatment. The treating conditions were the same as the above Examples 29 and 30. In the same manner as in Example 40, using adhesive B, the PFA film was laminated with a soft polyvinyl chloride film having a thickness of 200 μm.

The laminate was left to stand at room temperature for one day, and then a T-peel test was carried out at a pulling speed of 20 mm/min, whereby the adhesive strength was 960 gf/cm. In the same manner as in Example 37, immersion in boiling water for 5 hours was carried out, whereby the adhesive strength was 900 gf/cm.

Comparative Example 5

Firstly, one side of a PFA film (Aflex PFA, tradename, manufactured by Asahi Glass) having a thickness of 50 μm, was subjected to corona discharge treatment. The wetting index was measured by a wetting index reagent of Wako Junyaku, whereby it was 39 dyne. An adhesive prepared in the same manner as in Example 39 was coated by a gravure roll on this surface and dried at 100° C. to obtain a adhesive layer having a thickness of 5 μm after drying.

Then, this corona discharge-treated PFA film and a soft polyvinyl chloride film having a thickness of 200 μm were laminated by passing through nip rolls maintained at 110° C. The linear pressure of the nip rolls was 10 kgf/cm, and the laminating speed was 12 m/min. The laminate was left to stand at room temperature for one day, and then a T-peel test was carried out at a pulling speed of 20 mm/min, whereby the adhesive strength was 1200 gf/cm, but it was 200 gf/cm after the boiling water resistance test for 5 hours.

Examples 49 and 50 and Comparative Examples 6 to 8

A RF bombardment-treated or DC bombardment-treated PFA film surface is considered to have an improved adhesive property, since oligomers, etc. remaining on the surface have been removed by bombardment of Ar ions or neutral atoms. On the contrary, if oligomers, etc. remain substantially on the surface, they are attached by a weak force to the film surface, and when the PFA film is bonded to a predetermined substrate by an adhesive, they will be present between the adhesive and the surface of the film main body to reduce the adhesive strength. Further, when the bonded surface is peeled, the components such as oligomers, etc. are likely to be transferred to the adhesive side. By conventional corona discharge treatment, such oligomers, etc. tend to increase substantially than the non-treated film surface, whereby desired improvement of the adhesive strength can not be attained. Accordingly, the adhesive property of the surface-treated PFA film can be evaluated, for example, in such a manner that after the bombardment treatment, an adhesive tape is bonded on the treated surface of the PFA film and then peeled, and the amount of fluorine transferred to the adhesive surface of the tape is analyzed.

In Example 49 or 50, one side of a PFA film (Aflex PFA, tradename, manufactured by Asahi Glass) having a thickness of 50 μm was subjected to Rf bombardment treatment or DC bombardment treatment, respectively, using Ar as the atmosphere gas. A commercially available adhesive tape (width: 12 mm) manufactured by Nichiban K.K. was bonded on the treated PFA film surface and then peeled, whereupon the adhesive surface of the adhesive tape was subjected to an elemental analysis.

More specifically, firstly, the above mentioned adhesive tape (width: 12 mm) manufactured by Nichiban K.K., was cut into a length of about 2 cm, and bonded to the surface-treated PFA film surface under a load of from 0.5 to 5 kgf. At that time, an end portion was left "non-bonded" for about 5 mm.

Then, holding the non-bonded portion, the bonded tape was peeled in a direction perpendicular (90°) to the bonded surface under a load of from 1 to 10 kgf at a speed of about 1 cm/sec. The bonding and peeling of the adhesive tape were carried out at a temperature of from 20 to 25° C. under a relative humidity of from 50 to 70%.

Then, the bonded portion of the adhesive tape was cut into a size of about 3 mm×3 mm, which was analyzed by means of the above mentioned ESCA.

The analysis by means of ESCA was carried out by obtaining the ratio of the the total amount of F element being the component transferred from the PFA film, to the total amount of C element being the main component of the adhesive tape (F/C value). Table 3 shows the results. As Comparative Examples, similar measurements were carried out by using a PFA film subjected to RF bombardment treatment in oxygen (Comparative Example 6), a PFA film subjected to corona discharge treatment (Comparative Example 7) and a non-treated PFA film (Comparative Example 8). These results are also shown in Table 3. In Table 3, the F/C values in Examples 49 and 50 and Comparative Examples 6 and 7 are shown on the basis that the F/C value of the non-treated PFA (Comparative Example 8) is 1. Further, in Table 3, the adhesive strengths of the PFA films of Examples 49 and 50 and Comparative Examples 6 to 8, are also shown. The measurement of the adhesive strengths was carried out in the same manner as the measurement in Example 2.

TABLE 3

|  | Film treatment method | F/C value (non-treated being 1) | Adhesive strength (gf/cm) |
| --- | --- | --- | --- |
| Example 49 | RF bombardment (In Ar atmosphere gas) | 0.2 | 1020 |
| Example 50 | DC bombardment (In Ar atmosphere gas) | 0.4 | 1000 |
| Comparative Example 6 | RF bombardment (In $O_2$ atmosphere gas) | 10.8 | 75 |
| Comparative Example 7 | Corona discharge | 13.1 | 200 |
| Comparative Example 8 | Non-treatment | 1 | — |

From Table 3, it is evident that with the PFA film (Example 49 or 50) subjected to RF bombardment treatment or DC bombardment treatment using Ar as the atmosphere gas, the F/C value is small, i.e. the amount of fluorine transferred to the bonded surface of the tape is small, and thus it has excellent adhesive strength, whereas with the PFA film (Comparative Example 6) subjected to RF bombardment treatment in oxygen, or the PFA film ((Comparative Example 7) subjected to corona discharge treatment, the F/C value is large, i.e. the amount of fluorine transferred to the bonded surface of the tape is substantial, and it is inferior in the adhesive strength.

The evaluation carried out in these Examples 49 and 50 and Comparative Examples 6 to 8, was carried out by using an adhesive tape stipulated in JIS Z 1522, which had an adhesive strength of at least 2.94 N/10 mm.

INDUSTRIAL APPLICABILITY

According to the present invention, it is possible to obtain a PFA film which provides excellent adhesive strength and a laminate employing such a PFA film.

Further, according to the process for producing a laminate of the present invention, a laminate of a PFA film having an excellent adhesive property with a plastic sheet such as polyvinyl chloride, can be produced with good mass productivity.

Furthermore, according to the process for producing a laminate of the present invention, a laminate of a PFA film having an excellent adhesive property with a metal sheet such as SUS, can be produced with good mass productivity.

What is claimed is:

1. A process for producing a laminate, which comprises coating an adhesive containing a thermoplastic polyester resin component as the main component, on either one of a substrate or a tetrafluoroethylene-perfluoroalkoxyethylene copolymer film having its surface RF bombardment-treated, then drying the adhesive, and thereafter, bonding the substrate and the RF bombardment-treated tetrafluoroethylene-perfluoroalkoxyethylene copolymer film by the adhesive containing the thermoplastic polyester resin component as the main component, to form a laminate by a dry lamination method, wherein the amount of fluorine atoms removed from the treated surface of said copolymer film by an adhesive tape is not more than twice the amount of fluorine atoms removed from the surface of a non-surface-treated tetrafluoroethylene-perfluoroalkoxyethylene copolymer film.

2. A process for producing a laminate, which comprises coating an adhesive containing a thermoplastic polyester resin component as the main component, on either one of a substrate or a tetrafluoroethylene-perfluoroalkoxyethylene copolymer film having its surface DC bombardment-treated, then drying the adhesive, and thereafter, bonding the substrate and the DC bombardment-treated tetrafluoroethylene-perfluoroalkoxyethylene copolymer film by the adhesive containing the thermoplastic polyester resin component as the main component, to form a laminate by a dry lamination method, wherein the amount of fluorine atoms removed from the treated surface of said copolymer film by an adhesive tape is not more than twice the amount of fluorine atoms removed from the surface of a non-surface-treated tetrafluoroethylene-perfluoroalkoxyethylene copolymer film.

3. The process for producing a laminate according to claim 1 or 2, wherein the bombardment treatment is a bombardment treatment employing Ar gas.

4. A laminate prepared according to the process of claims 1 or 2.

* * * * *